Jan. 27, 1959  W. H. STOUT ET AL  2,871,033
COUPLER FOR PIPE SECTIONS WITH INTERMEDIATE
FLUID ACTUATED SEAL AND GRIPPING MEANS
Filed Aug. 17, 1953

INVENTORS
William H. Stout and
BY Paul H. Raumaker

Ruine Kolisch
Atty.

United States Patent Office 2,871,033
Patented Jan. 27, 1959

2,871,033

COUPLER FOR PIPE SECTIONS WITH INTERMEDIATE FLUID-ACTUATED SEAL AND GRIPPING MEANS

William H. Stout and Paul H. Raumaker, Portland, Oreg.; said Raumaker assignor to said Stout Application August 17, 1953, Serial No. 374,764

2 Claims. (Cl. 285—106)

This invention relates to devices for coupling sections of pipe to one another in a water-tight joint.

There are many uses for coupling arrangements whereby pipe sections may be readily and detachably sealed to one another. One field in which the necessity for such couplers has long been present is in irrigation pipeline systems. By way of example, the present invention will be described with relation to such a system; however, it should be understood that the invention can be utilized in other types of pipeline.

The principal object of the invention is the provision of an arrangement for two sections of pipe, whereby they can be easily coupled and uncoupled and will have a water-tight seal between them when coupled.

According to a feature of the invention, the sections of pipe will be secured to each other in direct relation to the pressure in the pipeline—the greater the pressure the more tightly coupled the two sections will be to each other and vice versa.

According to another feature of the invention, a water-tight seal between the two sections of pipe can be readily established.

Accordingly to another feature, a chamber is provided in between the walls of the outer pipe section and sealing sleeve in which the pressure is the same as that in the pipeline.

According to another feature of the invention, a single sleeve of elastic material and having a plurality of spaced parallel longitudinal ribs is in frictional contact with both of the pipe sections.

Still another feature provides that the single elastic sleeve is positioned by means of a seating ring extending from the inside surface of the outer pipe section, and a fluid passageway is provided through the ring.

Generally, the object and features of the invention are accomplished by means of having mounted between two telescoping sections of pipe, sleeve means, one end of which is sealed to the inner pipe section and the other end to the outer pipe section with a space or chamber between the sleeve and the inside wall of the outer pipe section, whereby, when there is pressure in the pipeline, the sleeve means will be forced into closer contact with the pipe sections.

The object and advantages of the invention will become more apparent from the following description taken in conjunction with the drawings forming part of this specification, and in which.

Figure 1:
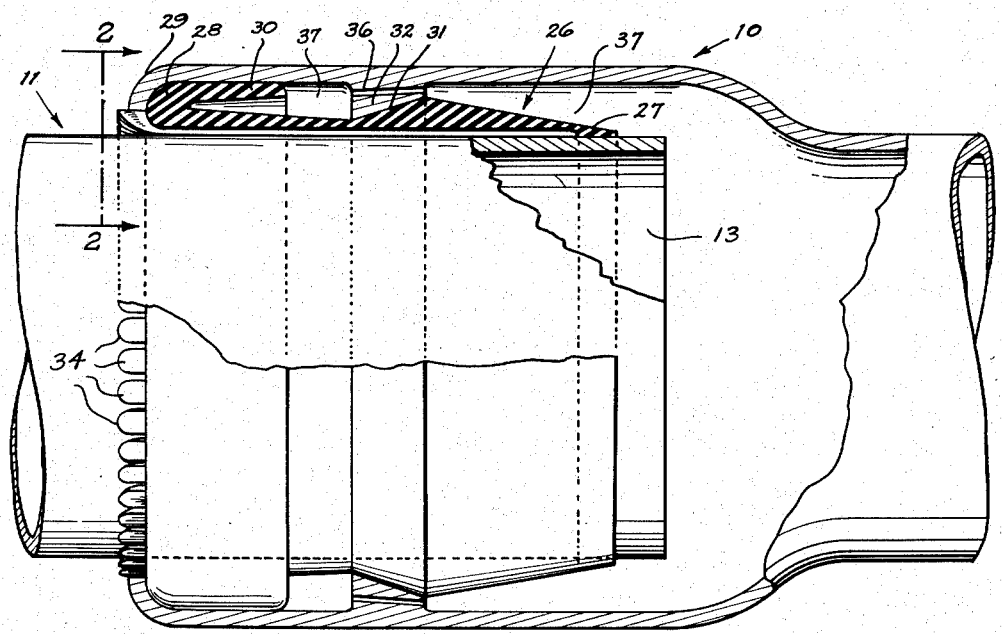
Fig. 1 is a side elevation partly in section of a pipe joint according to this invention.

Referring to the drawings according to embodiments of the invention, a single flexible gasket or sleeve is positioned within the bell section 10 of an irrigation pipe line. The sleeve and belt section receive in telescoped relation the spigot end 11 of another section of pipe.

The inner surface of the sleeve is provided with a plurality of spaced parallel ribs, which, under the action of hydraulic pressure within the pipeline, are pressed against the surface of the spigot end 11 and wipe it dry, in a squeegee-like action. The result is a relatively dry contact between the sleeve and spigot end where a much higher coefficient of friction exists between the parts than possible where the contacting portions are wet. This is particularly important where the sleeve is comprised of rubber or similar material and the pipe sections are comprised of metal.

Referring in particular to Fig. 1, there is frictionally positioned between bell section 10 and the spigot end a sleeve indicated generally at 26, which is formed from some elastic material such as soft rubber. When the term "rubber" is used, it is not intended to limit the invention to natural rubber but to any product which has similar elastic characteristics. For instance, a vinyl material is satisfactory.

The sleeve comprises a feather edge, annular sealing lip 27 at its rearward end which engages an end portion 13 of spigot end 11; a bulbous forward end 28 in engagement with an inturned lip 29 of bell section 10; a reversely turned tapered sealing lip 30 engaging the bell section; an angularly disposed annular surface 31; and a plurality of tread-like corrugations or ribs 33 formed in the inner surface of the sleeve and extending parallel to each other and to the longitudinal axes of pipe sections 10 and 11. The ribs 33, which have finger-like extensions 34 disposed between bell lip 29 and pipe section 11, define therebetween passageways 35.

Annular surface 31 engages a complementary annular abutment surface presented by a sleeve seating ring 32 integral with bell section 10. The annular abutment surface of ring 32 faces inwardly away from the opened outer end of bell section 10 through which pipe 11 is inserted, and annular surface 31 faces in the opposite direction or toward the open end of the bell section. Thus the surfaces coact to prevent movement of the sleeve out of the bell section.

Sleeve seating ring 32 is provided with a plurality of radially spaced bleeder passages 36 extending therethrough. Spaces or chambers 37 are provided on either side of the seating ring between the inside wall of the bell and sleeve which are connected together by passages 36. When the irrigation pipeline has been assembled, by inserting the spigot end into the bell section so that the spigot end extends past sealing lips 27 of the sleeve, the sleeve operates in the following manner in response to the build-up of hydraulic pressure in the pipeline. By virtue of bleeder passages 36 in ring 32, the water pressure in chambers 37 is equalized on both sides of ring 32 with that existing throughout the pipeline. The pressure is effective to force the forward end 28 of the sleeve and lip 30 into sealing relation with the lip 29 and the forward portion of the internal surface of bell section 10, thus forming a fluid seal between the sleeve and the bell section. Ring 32 anchors the central portion of the sleeve in position and combines with the pressure in chamber 37 in pressing the sleeve against the spigot end. The pressure is similarly effective to urge feather edge sealing lip 27 into pressing relation with end portion 13, thus effecting a fluid seal between the sleeve and spigot end 11.

The hydraulic pressure between the bell and the sleeve is further effective to press the ribs 33 of the sleeve against spigot end 11, which tends partially to flatten the rounded crests of the ribs. The greater the hydraulic pressure in the line, the more sleeve 26 is diametrically constricted about spigot end 11 and the tighter the engagement of the ribs carried by the sleeve with the spigot end. The pressure-induced partial deformation of the ribs serves to wipe or squeegee the water from those portions of the external surface of spigot end 11 which are engaged by ribs 33, thus effecting a substantial drying of these surface portions of the spigot end. The water is forced into passageways 35 and flows away from the sleeve area under the compressive action of the sleeve.

The dry rubber sleeve to pipe interfacial contact, induced by the described squeegee action, provides for a high degree of grip of the sleeve to the spigot end and prevents relative lateral movement between the bell section and spigot end when hydraulic pressure is introduced into the pipeline. This is an especially important consideration with pipes comprised of metal.

Figure 2:
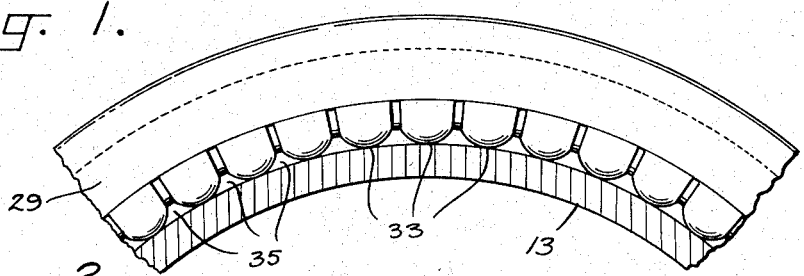
Fig. 2 is a section along the line 2—2 of Fig. 1.
Figure 3:
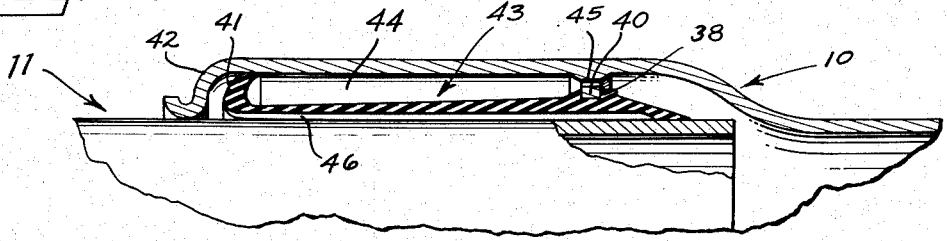
Fig. 3 is a longitudinal section of a modification of the invention.

A modification of the invention is shown in Fig. 3. The arrangement of Fig. 3 differs from that of Figs. 1 and 2 in that the sleeve is provided with an annular groove 38 serving to anchor the inner end of the sleeve to the bell section through a seating ring 40. Further, the sleeve is provided with a forward sealing lip 41 which, in the absence of hydraulic pressure, is in longitudinally spaced relation to a bell lip 42 at the forward end of the bell section. Also the elastic material forming sleeve 43 is desirably of a stiffer or harder grade than that forming sleeve 26 of the above first described embodiment of the invention. It will also be noted that in the modified form of the invention the sleeve is completely contained within the bell section, and does not protrude outwardly thereof.

Under the action of the hydraulic pressure within the pipeline, the pressure in chamber 44 is equalized with that of the rest of the line by means of passageway 45 through ring 40, and the relatively stiff lip 41 is urged longitudinally into engagement with bell lip 42. This lengthwise stretch of the sleeve tends to reduce the diameter of the sleeve and thereby enhance the gripping pressure of longitudinal parallel ribs 46 on spigot 11.

While these specific embodiments of the invention have been shown and described, it is to be understood that all substantial equivalents thereof are within the spirit and scope of the invention.

We claim:

1. In combination, axially aligned pipe sections having spigot and bell ends in spaced telescoped relation, an inwardly directed terminal lip on said bell, the outer surface of said spigot and the inner surface of said bell defining an annular space between said spigot and bell, an elongated rubber sleeve disposed within the annular space, a first lip on the inner end of the sleeve adapted to be sealed to the spigot, a second lip on the outer end of the sleeve adapted to be sealed to the bell, a seating ring having a hole therethrough carried internally of said bell end adapted circumferentially to engage said sleeve between the ends of said sleeve and adapted to allow fluid within said pipe sections to fill the portion of said annular space lying between the sleeve and said bell, and a plurality of rib-like protuberances and alternating depressions disposed in mutually parallel relation with the longitudinal axis of said sleeve, said protuberances and depressions being formed on the inner surface of the sleeve, the protuberances being in engagement with said spigot and being adapted under the action of hydraulic pressure in the portion of said annular space lying between the sleeve and the bell to effect a substantially dry interfacial gripping contact between said sleeve and spigot by pressing the protuberances against said spigot so as to force any liquid carried on the spigot into said depressions.

2. In combination, a bell section of pipe having an opened end, a spigot section of pipe extending into said bell section through said opened end, the outer surface of said spigot section and the inner surface of said bell section defining an elongated annular space between said sections, an elongated flexible sleeve disposed within said annular space and having at one end a first lip sealing said sleeve to said spigot section and at the other end a second lip spaced longitudinally from said first lip sealing said sleeve to said bell section, a seating ring having a hole therethrough carried by said bell section internally of said bell section, said seating ring having an abutment surface facing away from said opened end of said bell section, and an annular surface integral with said sleeve between said first and second lips, said annular surface facing said opened end of said bell section and abutting said abutment surface of said seating ring so as to prevent movement of said sleeve out of said bell section, said sleeve engaging said spigot section when hydraulic pressure is created by introducing fluid between said sleeve and said bell section.

References Cited in the file of this patent

UNITED STATES PATENTS

| 657,372 | Wiggins | Sept. 4, 1900 |
| 1,107,327 | Lewis | Aug. 18, 1914 |
| 1,117,962 | Phillips | Nov. 17, 1914 |
| 1,217,804 | Metzger | Feb. 27, 1917 |
| 1,300,414 | Klell | Apr. 15, 1919 |
| 1,843,202 | Buchanan | Feb. 2, 1932 |
| 2,047,569 | Loomis | July 14, 1936 |
| 2,066,008 | Knoerzer | Dec. 29, 1936 |
| 2,097,571 | Moran | Nov. 2, 1937 |
| 2,202,459 | Link | May 28, 1940 |
| 2,265,615 | Stalter | Dec. 9, 1941 |
| 2,352,192 | Gasche | June 27, 1944 |
| 2,465,197 | Chatham | Mar. 22, 1949 |
| 2,527,988 | Dillon | Oct. 31, 1950 |
| 2,538,683 | Guiler et al. | Jan. 16, 1951 |
| 2,649,105 | Stout et al. | Aug. 18, 1953 |
| 2,650,115 | Taylor | Aug. 25, 1953 |
| 2,652,282 | Willetts | Sept. 15, 1953 |

FOREIGN PATENTS

| 12,479 | Great Britain | May 29, 1907 |
| 534,863 | Germany | Nov. 18, 1927 |
| 318,163 | Great Britain | Aug. 26, 1929 |